United States Patent [19]

Van Workum

[11] 4,190,814
[45] Feb. 26, 1980

[54] SINGLE AXIS RESONATOR FOR LASER

[75] Inventor: John A. Van Workum, Albuquerque, N. Mex.

[73] Assignee: The United States of America as represented by the Secretary of the Air Force, Washington, D.C.

[21] Appl. No.: 882,525

[22] Filed: Mar. 1, 1978

[51] Int. Cl.$^2$ .............................................. H01S 3/081
[52] U.S. Cl. ............................... 331/94.5 C; 350/294
[58] Field of Search ...................... 331/94.5 C, 94.5 D; 350/294, 299, 293

[56] References Cited

U.S. PATENT DOCUMENTS

| | | | |
|---|---|---|---|
| 3,824,487 | 7/1974 | Buczek et al. | 331/94.5 C |
| 3,942,127 | 3/1976 | Fluhr et al. | 331/94.5 C |
| 3,969,688 | 7/1976 | Freiberg et al. | 331/94.5 C |
| 4,050,036 | 9/1977 | Chambers et al. | 331/94.5 C |

OTHER PUBLICATIONS

Edmonds, The Reflaxicon, A New Reflective Optical Element, and Some Applications, Applied Optics, vol. 12, No. 8 (Aug. 1973) pp. 1940-1944.

*Primary Examiner*—William L. Sikes
*Attorney, Agent, or Firm*—Joseph E. Rusz; Jacob N. Erlich

[57] ABSTRACT

A single axis resonator for use within a laser having an annular gain region. The single axis resonator extracts optical power from the annular gain region by the use of a beam expander, reflaxicon, corner cube and output coupler, wherein the optical axis of the resonator passes through the center of the output coupler. The reflaxicon transforms a substantially elliptically-shaped beam into a crescent-shaped beam which closely resembles the shape of a section of the annular gain region. The crescent-shaped beam is reflected through the gain region several times to build up energy before being translated back into its original shape for reflection out of the laser by the output coupler.

8 Claims, 2 Drawing Figures

SINGLE AXIS RESONATOR FOR LASER

STATEMENT OF GOVERNMENT INTEREST

The invention described herein may be manufactured and used by or for the Government for governmental purposes without the payment of any royalty thereon.

BACKGROUND OF THE INVENTION

This invention relates generally to lasers, and, more particularly to a single axis resonator for a laser having an annular gain region.

The operation of a laser is based upon the fact that the atomic systems represented by the atoms of the laser medium can exist in any of a series of discrete energy levels or states, the systems absorbing energy in the optical frequency range in going to a higher state and omitting it when going to a lower state.

The laser medium may be a solid, liquid or gas. In a case of a solid wherein a ruby is used as a laser material, three energy levels are utilized. The atomic systems are raised from the lower or ground level to the higher of the three levels by irradiation from, for example, a strong light source which need not be coherent but should preferably have a high concentration of energy in the absorbing wavelengths. A radiationless transition then occurs from the highest state to an intermediate or metastable state. This is followed by a transition with photon emission from the intermediate state back to the ground state. It is the last transition that is of interest since this transition is the source of the coherent light or electromagnetic energy produced by the laser.

The operation of raising the energy level of the laser material to produce the desired photon emission is referred to in the art as "pumping" and when more atoms reach an excited metastable state than remain in a lower energy level a "population inversion" is said to exist. The active medium in the laser is made optically resonant by placing reflectors or other optical devices, hereinafter referred to as the resonator of the laser, at the ends thereof, forming the resonant chamber therebetween. The resultant laser beam escapes from the resonant chamber.

Generally, gas systems are preferred for high average power lasers. Gas lasers are conventionally arranged to have gas flow through the resonant cavity or gain region.

Gas lasers are classified in accordance with the process by which the gas laser medium achieves the population inversion. Three conventional varieties of gas lasers are chemical lasers, electric discharge lasers and gas dynamic lasers. Chemical lasers achieve the population inversion by direct generation of higher energy vibrational states in the products of a chemical reaction. Electric discharge lasers achieve the population inversion by "pumping" the higher energy vibrational states in the media through the action of an electric current as in the manner set forth above with respect to the ruby laser. Gas dynamic lasers achieve the population inversion by reducing the population level of the lower energy vibrational state of a hot gas in thermal equilibrium through the rapid cooling caused by a supersonic aerodynamic expansion.

Since the possible application of high power lasers are unlimited in the fields of communication, manufacturing, construction, medicine, space exploration and defense, research in this area is ever expanding. In fact, it has now been shown that high energy lasers may be made more efficient by constructing these lasers of a cylindrical configuration. As a result, they provide a gain region which is annular in shape. Unfortunately, extracting optical power from an annular gain region has proven to be a difficult problem to solve.

SUMMARY OF THE INVENTION

The instant invention overcomes the problems encountered in the past by providing a single axis resonator for an annular laser which is designed to extract the optical power from the annular gain region.

The single axis resonator of this invention is in the form of an optical device having an output coupler, a nonlinear reflaxicon, a corner cube and a beam expander in optical alignment with the annular gain region of the laser. The resonator of the instant invention is designed to transform a beam with a simple cross-sectional shape, such as an ellipse, into a beam with a crescent shaped cross-section which closely matches a sector of the annular gain region. The crescent-shaped beam then passes through a sector of the gain region. After the first pass, the crescent-shaped beam is translated and reflected back through another sector of the gain region. After two or more passes, the crescent-shaped beam is transformed back into the original simple shape. While the beam has a simple shape, the optical energy may be outcoupled and expanded from the resonant chamber as with conventional resonators. The use of this invention to map the beam from its original shape into a crescent allows the optical axis to remain a single line at all times, and this feature results in the major advantages of the resonator of this invention.

It is therefore an object of this invention to provide a single axis resonator for a laser having an annular gain region.

It is another object of this invention to provide a single axis resonator which greatly reduces the problem of cooling the axicon tip.

It is still another object of this invention to provide a single axis resonator which reduces the sensitivity of output beam quality on mirror misalignment.

It is a further object of this invention to provide a single axis resonator for a laser which improves the mode selection.

It is still a further object of this invention which provides a single axis resonator which allows greater flexibility in locating the optical axis of the resonator.

It is still a further object of this invention to provide a single axis resonator for a laser which allows sturdy support of the annular gain generator without affecting the output beam of the laser.

It is still another object of this invention to provide a single axis resonator for a laser which is economical to produce and which utilizes conventional, currently available components that lend themselves to standard mass producing manufacturing techniques.

For a better understanding of the present invention, together with other and further objects thereof, reference is made to the following description taken in connection with the accompanying drawing and its scope will be pointed out in the appended claims.

DETAILED DESCRIPTION OF THE DRAWING

Figure 1:
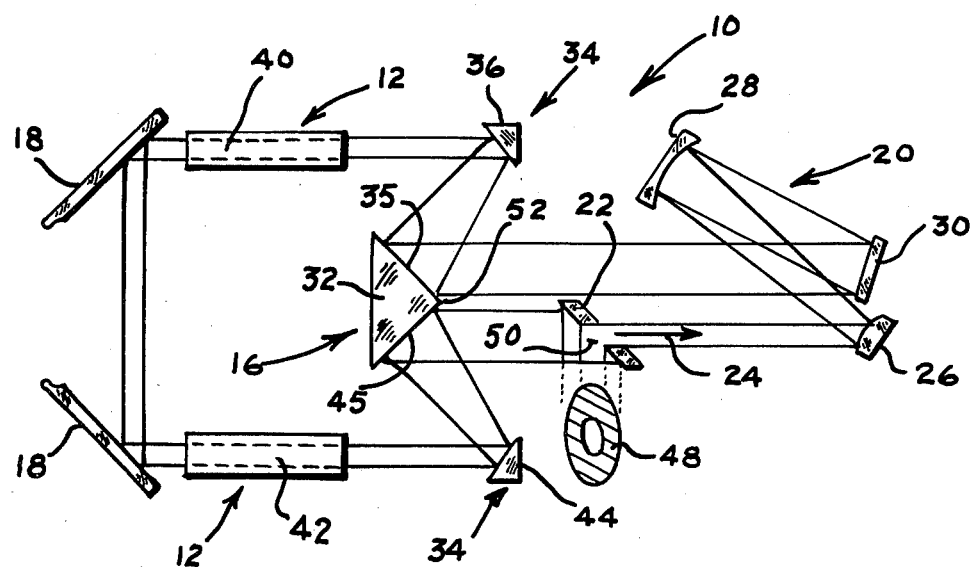
Figure 2:
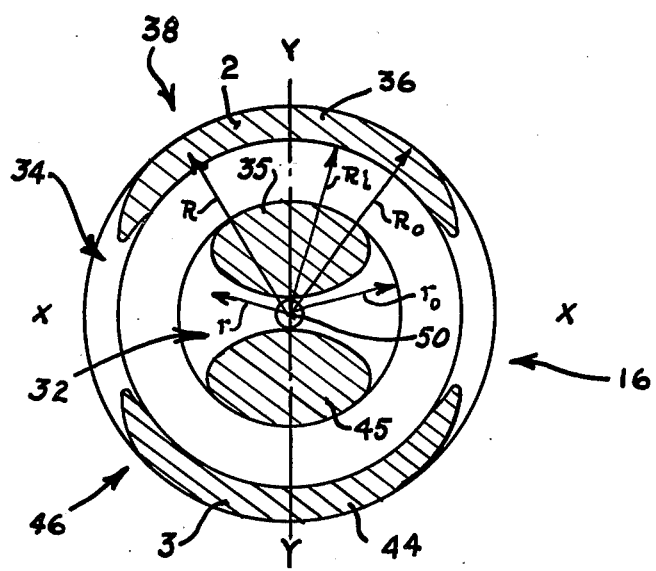

FIG. 1 represents a cross-sectional schematic illustration of the single axis resonator of this invention shown within a laser having an annular gain region; and FIG. 2 is an enlarged illustration of an end view of the reflaxicon of the single axis resonator of this invention with the footprints of the beam shown in cross-section.

DETAILED DESCRIPTION OF THE PREFERRED EMBODIMENT

Reference is now made to FIG. 1 of the drawing which clearly illustrates in cross-section the single axis resonator 10 of this invention in operative relationship with a conventional annular gain region 12 of laser 14.

The single axis resonator 10 of this invention is a travelling wave device made up of a nonlinear reflaxicon 16, a corner cube 18, beam expander 20 and output coupler 22. The elements of resonator 10 are in optical alignment with each other as well as annular gain region 12 in a manner to be described in detail hereinbelow.

As shown in FIG. 1 of the drawing a collimated beam of light 24 with an elliptical cross section is incident on output coupler 22. An elliptical portion of beam 24 passes through coupler 22 to beam expander 2. Beam expander 20 is made up of an off-axis convex mirror 26, a concave mirror 28 and a turning flat 30, all in optical alignment with one another and beam 24. Beam 24 is reflected by convex mirror 26 and expands to concave mirror 28 which recollimates beam 24. From concave mirror 28, beam 22 is directed to turning flat 30 and reflected to reflaxicon 16.

Reflaxicon 16 is composed of a centrally disposed inner cone or axicon 32 and an outer cone 34 in optical alignment with one another as well as with beam expander 20 and annular gain region 12 of laser 14. Beam 24 travels from turning flat 30 of beam expander 20 to the upper half 35 of inner cone or axicon 32 of reflaxicon 16. From inner cone 32 beam 24 is then reflected to the upper half 36 of outer cone 34 of reflaxicon 16. The upper half 38 of FIG. 2 illustrates clearly the footprints of beam 24 in cross-section as it makes its first pass through reflaxicon 16.

As shown in FIG. 2, reflaxicon 16 transforms elliptically-shaped beam 24 into a crescent-shaped beam 24. Crescent-shaped beam 24 propagates to corner cube 18 through the upper half 40 of annular gain region 12. Corner cube 18 then translates and flips beam 24 so that the crescent-shaped beam 24 can pass through the lower half 42 of gain region 12.

Crescent-shaped beam 24 passes from the lower half 42 of annular gain region 12 onto the lower half 44 of outer cone 34 of reflaxicon 16 which reforms the crescent-shaped beam 24 back into an elliptically-shaped beam 24. Outer cone 34 then reflects elliptically-shaped beam 24 to lower half 45 of inner cone 32 of reflaxicon 16 as clearly illustrated in the lower half 46 of FIG. 2. Elliptical beam 24 then travels to output coupler 22 where an elliptically-shaped annular portion 48 of beam 24 is reflected out of laser 10.

During the operation of laser 14, beam 24 traverses the optical path set forth hereinabove many times with the output of laser 14 being obtained from output coupler 22. The geometry of resonator 10 of this invention must be so arranged that the optic axis thereof passes through the center 50 of the hole of output coupler 22 and so that beam 24 does not touch the tip 52 of the axicon or inner cone 32 of reflaxicon 16. This arrangement is distinctly set forth in FIGS. 1 and 2 of the drawing.

An estimate of the intensity distribution of the single axis resonator 10 of this invention is obtained by the analysis presented hereinbelow. In this analysis the gain medium which may be in the form of a gas and located within annular gain region 12 is assumed to be homogeneous, and the line shape does not change during saturation. The saturated gain coefficient g is related to the unsaturated gain coefficient $g_o$ by $$g = g_o/(1+\beta) \quad (1)$$

The total intensity of the beam is $\beta$. The change in intensity, $d\beta$, of a beam passing through a gas of thickness dz is given by $$d\beta = \beta g \, dz \quad (2)$$

After passing through gain region 12 of thickness L; the output intensity, $\beta$, is given by $$\beta \exp \beta = \beta_i \exp(\beta_i + g_o L) \quad (3)$$

where $\beta_i$ is the input intensity. Since beam 24 passes through gain region 12 in only one direction, equation (3) may be used to study resonator 10.

The steady state intensity of a ray which is coincident with the optic axis of resonator 10 and incident on the lower half 45 of axicon or inner cone 32 can be easily determined. The intensity of the ray as it leaves reflaxicon 16 at point 3 shown in FIG. 2 is $\beta_3$. After passing through beam expander 20, its intensity as it enters reflaxicon 16 at point 2 is $\beta_2$.

$$\beta_2 = \beta_3/M^2 \quad (4)$$

where M is the magnification of beam expander 20. Placing condition 4 in equation 3, we have $$\beta_3 = (M^2 - 1/M^2) = Ln(1/M^2) + g_o L \quad (5)$$

The intensity of a ray after it travels from inner cone 32 to outer cone 34 may be obtained from the geometric properties of reflaxicon 16. The transformation of a point from inner cone 32 to outer cone 34 is given by $$R = R_i + k(r,\phi)r \quad (6)$$

Wherein the meaning of the variables is shown in FIG. 2 of the drawing. The function $k(r,\phi)$ describes the way points on inner cone 32 are mapped to outer cone 34. We will set k equal to a constant less than one for analysis. A differential element of area on inner cone 32 is given by $$dA_i = r \, d\phi \, dr \quad (7)$$

on outer cone 34, we have $$dA_o = R \, d\phi \, dr \quad (8)$$

The ratio of intensities is given by $$B_o/B_i = dA_i/dA_o \quad (9)$$

$$B_o/B_i = r/(R_i + kr)K \quad (10)$$

Using equations 3, 4, and 10, we can determine the intensity of a ray after one or more round trips through resonator 10 of this invention. If we start many rays very close to the optic axis of resonator 10 and allow them to make many round trips through resonator 10, their intensities when they reach the output annulus 48 will be a rough estimate of the output intensity distribution from resonator 10.

Although this invention has been described with reference to a particular embodiment, it will be understood to those skilled in the art that this invention is also capable of further and other embodiments within the spirit and scope of the appended claims. For example, the resonator could be converted from a traveling wave resonator to a standing wave resonator by reconfiguring and repositioning lenses 26 and 28.

I claim:

1. In a laser having an annular gain region and a resonator, the improvement therein residing in said resonator, said resonator comprising means for expanding a beam of radiant energy which impinges thereon and reflecting said expanded beam of radiant energy therefrom, means in optical alignment with said expanding and reflecting means and said gain medium for altering the shape of said expanded beam, relecting said altered beam through said gain medium, reconstructing said altered beam to said expanded shape and reflecting said expanded beam therefrom, and means in optical alignment with said shape altering and reflecting means for receiving said expanded beam therefrom, reflecting a portion of said beam out of said laser and directing the remainder of said beam back to said expanding and reflecting means, the optical axis of said resonator passing through the center of said receiving and reflecting means.

2. In a laser as defined in claim 1 wherein said shape altering and reflecting means comprises a reflaxicon and a corner cube, said reflaxicon and said corner cube being positioned on opposite sides of said annular gain region and in optical alignment therewith.

3. In a laser as defined in claim 1 wherein said receiving and reflecting means comprises an output coupler having a centrally located aperture therein, said optical axis of said resonator passing through the center of said output coupler.

4. In a laser as defined in claim 3 wherein said shape altering and reflecting means comprises a reflaxicon and a corner cube, said reflaxicon and said corner cube being positioned on opposite sides of said annular gain region and in optical alignment therewith.

5. In a laser as defined in claim 4 wherein said expanding and said reflecting means comprises a convex mirror, a concave mirror and a turning flat.

6. In a laser as defined in claim 2 wherein said reflaxicon comprises an outer cone and an inner cone whereby a portion of said inner cone altering said expanded beam to a crescent-shaped beam and reflecting said crescent-shaped beam to a portion of said outer cone, said outer cone reflecting said crescent-shaped beam through a section of said annular gain region and onto said corner cube which reflects said crescent-shaped beam through another section of said annular gain region and onto another portion of said outer cone, said outer cone reconstructing said crescent-shaped beam to said expanded shape, said outer cone reflecting said expanded beam to another portion of said inner coned, said other portion of said inner cone reflects said beam to said receiving and reflecting means.

7. In a laser as defined in claim 6 wherein said receiving and reflecting means comprises an output coupler having a centrally located aperture therein, said optical axis of said resonator passing through the center of said output coupler.

8. In a laser as defined in claim 6 wherein said expanding and said reflecting means comprises a convex mirror, a concave mirror and a turning flat.

* * * * *